Oct. 9, 1934.                R. MANNL                1,976,179

ADJUSTING DEVICE FOR X-RAY TUBES

Filed April 22, 1931

R. Mannl
inventor
Glascock, Downing &
Seebold
Attys.

Patented Oct. 9, 1934

1,976,179

UNITED STATES PATENT OFFICE 1,976,179

ADJUSTING DEVICE FOR X-RAY TUBES

Rudolf Mannl, Karlsbad, Czechoslovakia

Application April 22, 1931, Serial No. 532,073
In Czechoslovakia April 28, 1930

2 Claims. (Cl. 250—34)

In X-ray treatment an exact adjustment of a beam of rays on the object to be investigated or treated is necessary. The X-rays must strike the body in a manner dependent upon the objects of the treatment. The beam of rays must be limited by different kinds of screens in such a manner that only the part of the body to be examined or treated is reached by the X-rays, while the other parts are protected from the action thereof. These requirements are not easily fulfilled on account of the X-rays being invisible. In some cases, therefore, the X-ray tube was removed from its container and replaced by an auxiliary lamp, which emitted a cone of visible light, which extended in a similar manner to the X-rays and made possible the adjustment of the tube and the screens by sight. Before the treatment the auxiliary light had to be removed and replaced by the X-ray tube, a process which is undesirable in many respects.

As an improvement adjusting devices have been made in which the auxiliary source of light was brought into the direction of the central ray of the X-ray tube, a mirror being arranged between the tube and the auxiliary lamp. The foci of the X-ray tube and the auxiliary source were at the same distance from the mirror, so that the light rays spread out to the same extent as the X-rays emitted by the anti-cathode. A disadvantage was that the shadow of the adjusting lamp was greatly magnified and projected into the middle of the field of vision and disturbed the centering, it was, therefore, necessary to use very small and consequently weak lamps. Finally the auxiliary lamp had to be removed before the X-ray treatment.

According to the present invention the detrimental shadow of the auxiliary lamp is avoided by this, that it is provided outside the cone of rays and the mirror is correspondingly inclined. With this arrangement it is not necessary to cut-out the auxiliary source of light and remove it from the path of rays. It may remain in operation while the X-ray tube is working which makes possible constant observation of the field of radiation in X-ray therapy.

Instead of the mirror lenses or prisms may also be used to deflect the rays from the auxiliary lamp and make them appear to come from the focus of the X-ray tube. In certain cases spherical mirrors may advantageously be used instead of plain ones.

A constructional example of the invention is illustrated diagrammatically in the accompanying drawing in which:—

Figure 1:
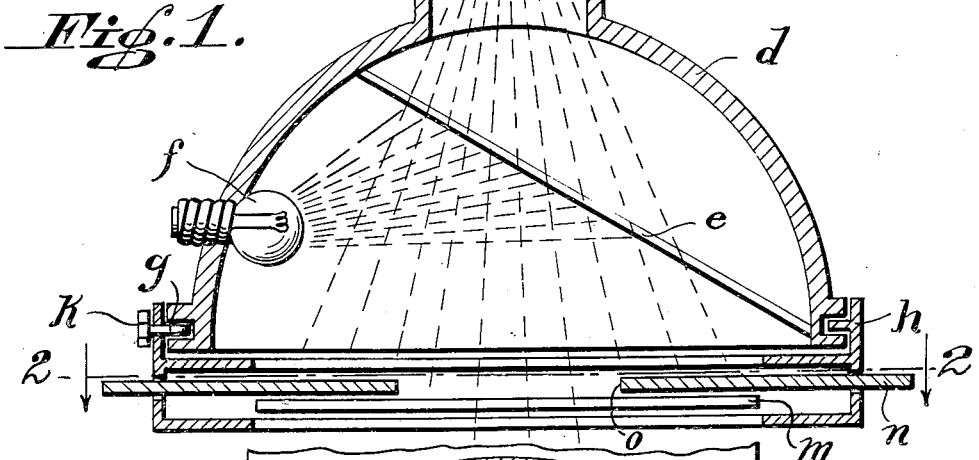
Figure 2:
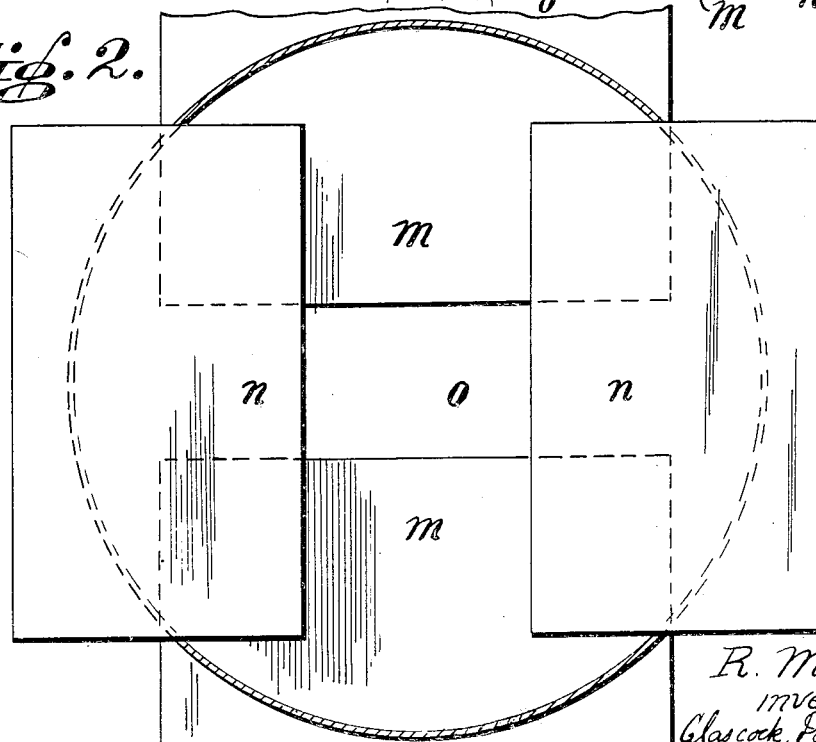

Fig. 1 is a section in the longitudinal direction of the X-ray tube, and
Fig. 2 is a section on line 2—2 of Fig. 1.

Referring now, more particularly, to the drawing $a$ designates the X-ray tube, $b$ the anti-cathode from which the X-rays are emitted. $c$ represents the opaque container for the X-ray tube with the branch $d$. In the branch are arranged the mirror $e$ and the projection lamp $f$, which throws its light on the mirror in such a manner, that it is reflected in the direction of the X-rays. The mirror is covered from the edges to the size of the useful cone of X-rays. The edge of the branch is provided with an annular groove $g$ for securing a turnable screening device $h$. After inserting the auxiliary lamp $f$ the container constitutes a dark lantern whose light cone appears to be emitted by the anticathode $b$ of the X-ray tube and can be limited by the screening device $h$.

The screening device is of the double slide type and the attachment is effected on one side at $i$ by a pivot and on the other side by a set screw $k$. There are two pairs of sliding members or shutters $m$ and $n$. Fig. 2 shows the shape of the opening $o$ which is preferably rectangular formed by the pairs of sliding members or shutters $m$ and $n$.

According to the invention the auxiliary cone of light is so limited at the mirror or in the path of the rays, that it corresponds exactly to the available beam of X-ray passing out of the protecting sleeve. Not only the limitation of the beam of X-rays, but also its other properties can be indicated according to the invention. It is a question of non-uniform intensity in the beam of X-rays which increases towards the cathode side and falls away towards the anode side, as well as the non-uniform character of the beam of X-rays within the cone of rays, as regards the sharpness of the image obtained. With many X-ray tubes oval or band like emission surfaces are used which in the direction of access of the cone of rays, which are used, appear four-shortened into a circle or square and within this range give the optimum sharpness of image, while towards the cathode they are lengthened in the form of an ellipse or rectangle and towards the anode are still four-shortened. Consequently the sharpness of image obtainable within the cone of rays decreases noticeably towards the cathode side.

According to the invention these complicated conditions within the cone of X-rays are made visible by different colour screens or built up like filters, being provided in the cone of auxiliary light, which do not obstruct the X-rays but cause variations in brightness, colour or the like in the cone of visible light. The same effect can also be obtained by altering the mirror.

For the purposes of X-ray therapy it may be of advantage to replace the usual opaque filters of zinc, copper or aluminium, by suitable coloured glasses or the like, which absorb X-rays. In this way the field affected by the X-ray is simultaneously illuminated by a coloured light, so that a direct control of the filter used is possible.

What I claim is:—

1. An adjusting device for X-ray tubes comprising a mirror within the X-ray cone and inclined in the direction of the axis thereof and an auxiliary lamp arranged outside the X-ray cone with its rays projecting on the mirror and reflected so as to place a visible spatially identical light cone over the invisible X-ray cone.

2. An adjusting device for X-ray tubes comprising a mirror within the X-ray cone inclined towards the axis thereof and an auxiliary lamp outside the X-ray cone with its rays projecting on the mirror and reflected so as to place a visible spatially identical light cone over the invisible X-ray cone, and an adjustable screening device for light rays and X-rays which is adapted to turn on the adjusting device for enabling a simultaneous and identical blinding of the visible light ray beam and the invisible X-ray beam.

RUDOLF MANNL.